J. A. SMILEY.
COTTON-BOLL OR HULL SEPARATOR.

No. 192,393. Patented June 26, 1877.

Witnesses
Chas. C. Gill
Frank McDowell

Inventor
James A. Smiley
By his att'ys
Cox and Cox

UNITED STATES PATENT OFFICE.

JAMES A. SMILEY, OF PRATTVILLE, ALABAMA.

IMPROVEMENT IN COTTON BOLL OR HULL SEPARATORS.

Specification forming part of Letters Patent No. 192,393, dated June 26, 1877; application filed May 8, 1877.

*To all whom it may concern:*

Be it known that I, JAMES A. SMILEY, of Prattville, in the county of Autauga and State of Alabama, have invented a new and useful Improvement in Cotton Boll or Hull Separators, of which the following is a specification, reference being had to the accompanying drawings.

The invention relates to an improvement in cotton boll or hull separators; and consists in the peculiar arrangement and construction of devices, hereinafter specifically described, the object being to furnish an effective means of separating the bolls or hulls from cotton.

Figure 1:
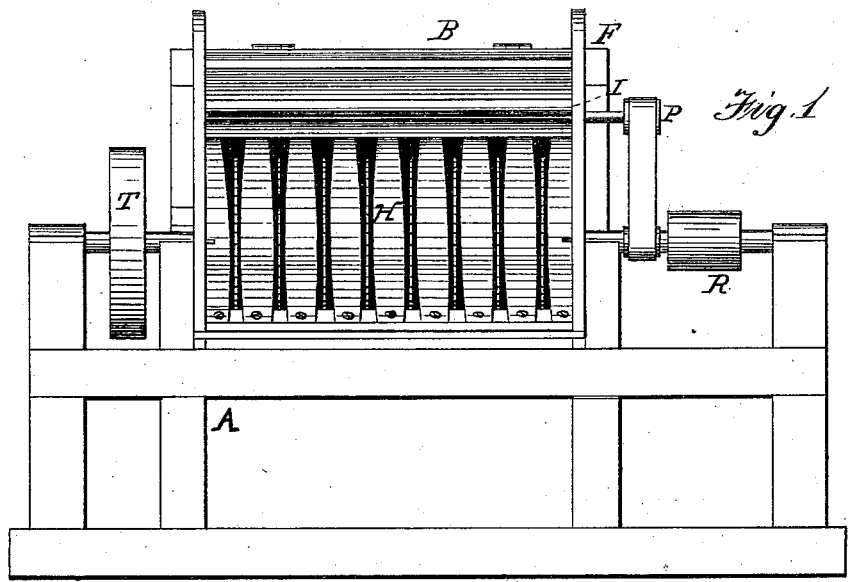
Figure 2:
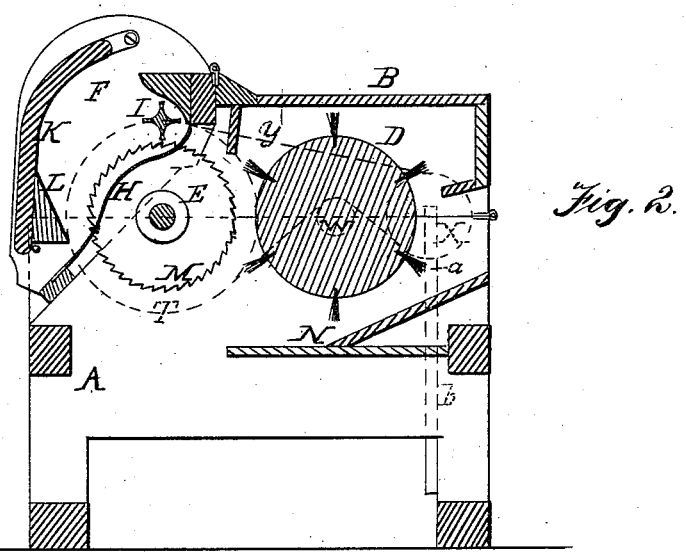

Referring to the accompanying drawings, Figure 1 is a front view of a device embodying the elements of the invention. Fig. 2 is a central vertical longitudinal section of same.

In the accompanying drawings, A represents the frame of the machine, which is provided with a roof, B, hinged at its lower rear end to the upper rear portion of the frame, and is of proper size to suitably cover the brush-cylinder D and the rear edge of the toothed cylinder E.

Upon the front upper edge of the roof B is hinged the cotton-box head F, in which is secured the ribs or grid H, and above these, near the top of the head, and in juxtaposition to the grid, the fluted roller I.

The seed-board K is hinged in the front portion of the head F, and is provided on its lower inner surface with the inclined conveyer L, which, when the head F is in position, and the saws M are projecting between the ribs, carries the hulls and other trash against the saws again and again on their passage to the ground, until they are entirely denuded, when they are allowed to escape.

The central parts of the ribs H are broader than those ordinarily employed, and are cut away near their upper and lower ends, as shown, to allow the cotton, with its seed, to pass between them. The said ribs are separated at their upper ends to permit the passage of seed through them, and at their lower so as to allow any seed that may adhere to the saws to re-enter the boll-box without touching the teeth.

Immediately in front of this portion of the ribs is transversely secured the fluted roller I, which revolves in a contrary direction to that of the saws M, and thereby prevents the cotton and other matter choking the device, by continually sweeping it from the upper part of the ribs as it there accumulates in ill-proportioned quantities, but at the same time allowing a proper operation of the machine.

In the rear of the saws M is journaled the brush-cylinder D, which is of ordinary construction, and removes the cotton from the saws in the general way.

Below the brush-cylinder is furnished the mote-board N, upon which particles of foreign matter fall from the cotton and cylinder, and are thence brushed to the ground, or otherwise disposed of, as desired.

The axles of the cylinders D E are mounted, in suitable bearings, in the upper edges of the frame A. The axle of the fluted roller I is journaled in the sides of the head F, and has one of its ends extending beyond the side of the said head a proper distance, where it is provided with a band-wheel, P, connected with a similar wheel upon the cylinder E by a belt, whereby motion is communicated from the said cylinder to the fluted roller. The annular weight R is furnished to increase the momentum of the cylinder. Upon the side of the machine opposite the above-mentioned belt and wheels the axles of the cylinder D E are provided with the belt-wheels T W, which are connected with the wheel X by the belt Y; thus motion is imparted by one axle to the other.

The wheel X is secured upon an axle in the upper or fork end of the adjustable standard *a*, which has a vertical movement in the grooves *b* formed in the frame A.

The band or belt Y is passed around the wheels T and X, and over the wheel W, and can be tightened or loosened, as desired, by simply raising or lowering the standard *a*.

The cotton, with its bolls or hulls, is fed to the machine through the space between the upper edge of the seed-board K and the head F, and it is then taken up by the revolving saws M and removed from the bolls or hulls, which fall below, and are treated as hereinbefore mentioned, the cotton and seed passing upward through the enlarged spaces at the upper end of the ribs H, and are then detached from the saws by the brush-cylinder D, whence they are subjected to the ordinary cotton-gin, and the seeds removed.

What I claim as my invention, and desire to secure by Letters Patent, is—

The ribs H, formed as shown, and spaced above and below, for the purposes specified.

In testimony that I claim the foregoing improvement in cotton boll or hull separators, as above described, I have hereunto set my hand this 30th day of April, 1877.

JAMES A. SMILEY.

Witnesses:
U. L. ELLIS,
J. W. MATHEWS.